United States Patent
Fisher

(10) Patent No.: US 10,884,719 B2
(45) Date of Patent: Jan. 5, 2021

(54) DYNAMIC MODEL REFLECTION

(71) Applicant: Synchrony Bank, Draper, UT (US)

(72) Inventor: David Fisher, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 15/796,605

(22) Filed: Oct. 27, 2017

(65) Prior Publication Data

US 2019/0129698 A1 May 2, 2019

(51) Int. Cl.
- *G06F 9/44* (2018.01)
- *G06F 8/41* (2018.01)
- *G06F 9/448* (2018.01)

(52) U.S. Cl.
CPC .............. *G06F 8/41* (2013.01); *G06F 9/4488* (2018.02)

(58) Field of Classification Search
CPC ..... G06F 8/38; G06F 8/30; G06F 8/51; G06F 8/41; G06F 9/4488
USPC ........................................................ 717/137
See application file for complete search history.

(56) References Cited

U.S. PATENT DOCUMENTS

| | | | | |
|---|---|---|---|---|
| 6,760,905 B1 * | 7/2004 | Hostetter | ............ | G06F 9/44521 717/148 |
| 6,918,126 B1 * | 7/2005 | Blais | ..................... | G06F 9/4488 719/332 |
| 6,925,638 B1 * | 8/2005 | Koved | .................. | G06F 9/4488 717/155 |
| 7,526,752 B1 * | 4/2009 | Darcy | ..................... | G06F 9/449 717/107 |
| 7,533,389 B2 * | 5/2009 | Verbeke | ............. | G06F 9/44521 717/166 |
| 7,970,730 B2 * | 6/2011 | Meijer | ..................... | G06F 8/30 707/601 |
| 9,092,237 B2 * | 7/2015 | Burka | ................... | G06F 9/4493 |
| 10,067,957 B1 * | 9/2018 | Aman | ............... | G06F 17/30707 |
| 10,146,522 B1 * | 12/2018 | Sundresh | ................. | G06F 8/41 |
| 10,275,226 B2 * | 4/2019 | Cimadamore | ........ | G06F 9/4488 |
| 2002/0049603 A1 * | 4/2002 | Mehra | ..................... | G06F 9/465 726/3 |
| 2004/0172639 A1 * | 9/2004 | Luo | ........................ | G06F 9/4488 719/328 |
| 2005/0097110 A1 * | 5/2005 | Nishanov | .......... | G06F 17/30569 |
| 2006/0048110 A1 * | 3/2006 | Medvedev | .............. | G06F 9/542 717/143 |
| 2006/0123046 A1 * | 6/2006 | Doise | ..................... | G06F 8/437 |

(Continued)

*Primary Examiner* — Wei Y Zhen
*Assistant Examiner* — Brahim Bourzik
(74) *Attorney, Agent, or Firm* — Polsinelli

(57) ABSTRACT

A method that includes obtaining, by an application executing on a computing system, a list of properties defining at least one property. The executing application writes an uncompiled class definition implementing a compiled interface and writes one or more properties of the compiled interface into the uncompiled class definition. The executing application writes the at least one property and at least one serialization attribute into the uncompiled class definition. The executing application causes the uncompiled class definition to be compiled, loads the compiled class definition, and creates an object by instantiating the compiled class definition. The object is serializable. The executing application may reflect on the compiled interface to obtain the one or more properties. Each of the one or more properties is strongly typed.

18 Claims, 4 Drawing Sheets

(56) References Cited

U.S. PATENT DOCUMENTS

| | | | |
|---|---|---|---|
| 2006/0130038 A1* | 6/2006 | Claussen | G06F 9/4492 717/168 |
| 2009/0024986 A1* | 1/2009 | Meijer | G06F 8/41 717/137 |
| 2009/0037895 A1* | 2/2009 | Le Roy | G06F 11/0718 717/165 |
| 2013/0139134 A1* | 5/2013 | Burka | G06F 9/4493 717/153 |
| 2015/0277899 A1* | 10/2015 | Hamby | G06F 9/4552 717/120 |
| 2017/0116007 A1* | 4/2017 | Cimadamore | G06F 8/315 |

* cited by examiner

```
[Serializable()]
public class StaticDynamicObject : IData
{
  public int IData.ID
  {
    get
    {
      return IData.ID;
    }
    set
    {
      IData.ID = IData.ID + 1;
    }
  }
  public int PropertyList1
  {
    get
    {
      return PropertyList1;
    }
    set
    {
      PropertyList1 = 10;
    }
  }
  int function1 ()
  {
    return IData.ID + 10;
  }
}
```

FIG. 3

DYNAMIC MODEL REFLECTION

BACKGROUND OF THE INVENTION

Field of the Invention

The present invention is directed generally to methods of creating objects at runtime.

Description of the Related Art

Serialization is a process of converting a state of an object into a stream of data that can be transmitted over a network, shared with another computer program, and/or stored in a persistent storage location (e.g., a physical file, a database, a cache (such as an ASP.NET Cache), and the like). Serialization allows an exact copy of the object to be recreated (e.g., at a later point in time) from the data stream. Serialization also allows the state of the object to be sent as the data stream from a first application domain to a different second application domain.

An object is created by instantiating a class or a struct. A class defines a collection of properties and/or methods that an instance of the class will include. Objects (or instances of classes) are created during execution and may be destroyed (e.g., when execution terminates) unless they have been serialized. Before a class definition is compiled, a developer can specify all or portions of the class as being serializable using attributes. Thus, any instances of the class can be serialized (or converted to a data stream) in accordance with the developer's specifications. However, a class cannot be made serializable after its class definition has been compiled because the attribute(s) that define the serialization method cannot be added to the class definition or re-asserted after the class definition has been compiled.

An interface contains only signatures of one or more methods, properties, events, and/or indexers. Thus, a class (or struct) must be used to implement the interface. A class that implements an interface includes instructions implementing the one or more methods, properties, events, and/or indexers. For example, an interface might include a signature of a method "void HelloWorld(string)" which does not return a value and receives a parameter of a string type. However, the interface does not specify what the method "void HelloWorld(string)" does. A class implementing the interface would include these instructions.

One or more classes and/or interfaces may be compiled into an assembly (e.g., a dynamic link library ("DLL") file or an executable ("EXE") file). An executing computer program may load an assembly and create objects by instantiating one or more of the classed compiled therein. However, an interface cannot be instantiated.

Reflection is the ability of a computer program to examine and modify the structure and behavior of the computer program itself at runtime. Objects are allowed to reflect by any object-oriented programming language. Reflection allows the computer program to obtain information about the classes defined within an assembly as well as objects that are instances of such classes. For example, reflection may be used to dynamically create an instance of a class, bind a class to an existing object, and/or determine the class (or type) of an existing object.

A programmer may create a dynamic object without specifying its type, and dynamically (late) bind the dynamic object to a type at runtime. For example, the compiled computer program may load an assembly, use reflection to select a class from the assembly, and assign the selected class to the existing dynamic object. This technique may be useful if the programmer does not know the type of the dynamic object at compile time, which may occur when the type of the dynamic object is dependent upon user input or data having an unpredictable format. By way of another example, the programmer can create a dynamic object and specify its members at runtime.

A strongly typed operation (e.g., a procedure, a function, and the like) accepts only parameters of specified types. If one or more parameters sent to a strongly typed operation are not of the correct specified type, the compiler will generate an error. If this occurs at runtime, a runtime error may occur. Therefore, it is difficult to perform a strongly typed operation on a dynamic object because the type of the dynamic object is established or can change at runtime.

To run a strongly typed operation against a dynamic object, at least one of two things must be true. First, the object type (or class) must be known ahead of time, meaning the code must be written and compiled for the class instantiated by the dynamic object. However, if this is the case, the object is not dynamic at runtime. Instead, strongly type (fully coded) classes may be implemented, which is tedious and does not allow changes to be made to the object (or its attributes) when the computer program is running.

Second, the dynamic object must implement a known interface that specifies properties and/or methods expected by the strongly typed operation. If the interface is known, a class (or struct) implementing the interface can be defined at runtime, but an object that is an instance of that class cannot be serialized at runtime.

Thus, a need exists for methods creating dynamic objects upon which strongly typed operation can be performed and that can be serialized during runtime. The present application provides these and other advantages as will be apparent from the following detailed description and accompanying figures.

BRIEF DESCRIPTION OF THE SEVERAL VIEWS OF THE DRAWING(S)

FIG. 3 is a diagram illustrating a class definition created by the method of FIG. 1.

Like reference numerals have been used in the figures to identify like components.

DETAILED DESCRIPTION OF THE INVENTION

Figure 1:
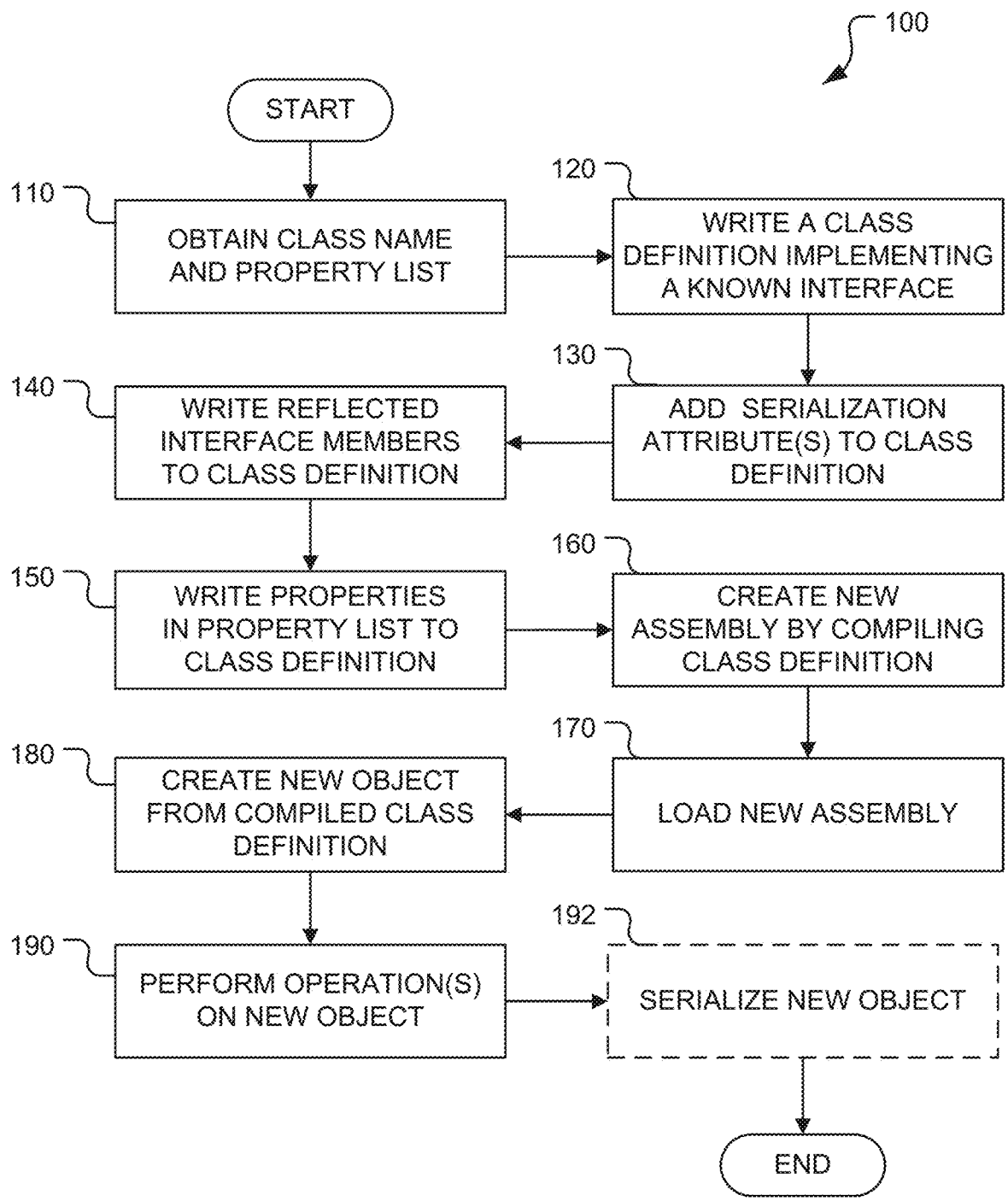
FIG. 1 is a flow diagram of a method of creating a compiled static "dynamic" class definition and instantiating the compiled class definition to create a "partially strongly typed" new object at runtime.
Figure 2:
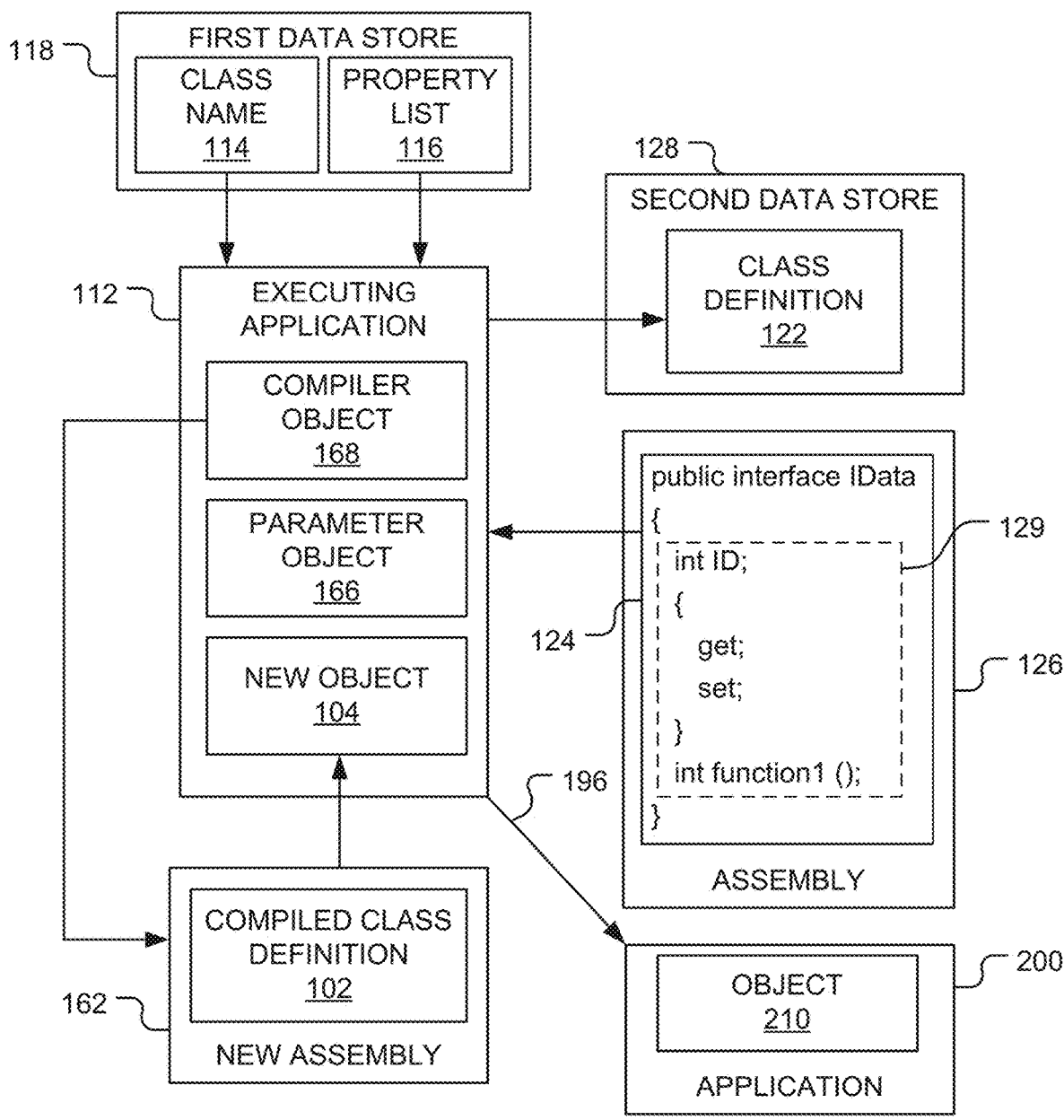
FIG. 2 is a block diagram illustrating an executing computer application performing the method of FIG. 1.
Figure 4:
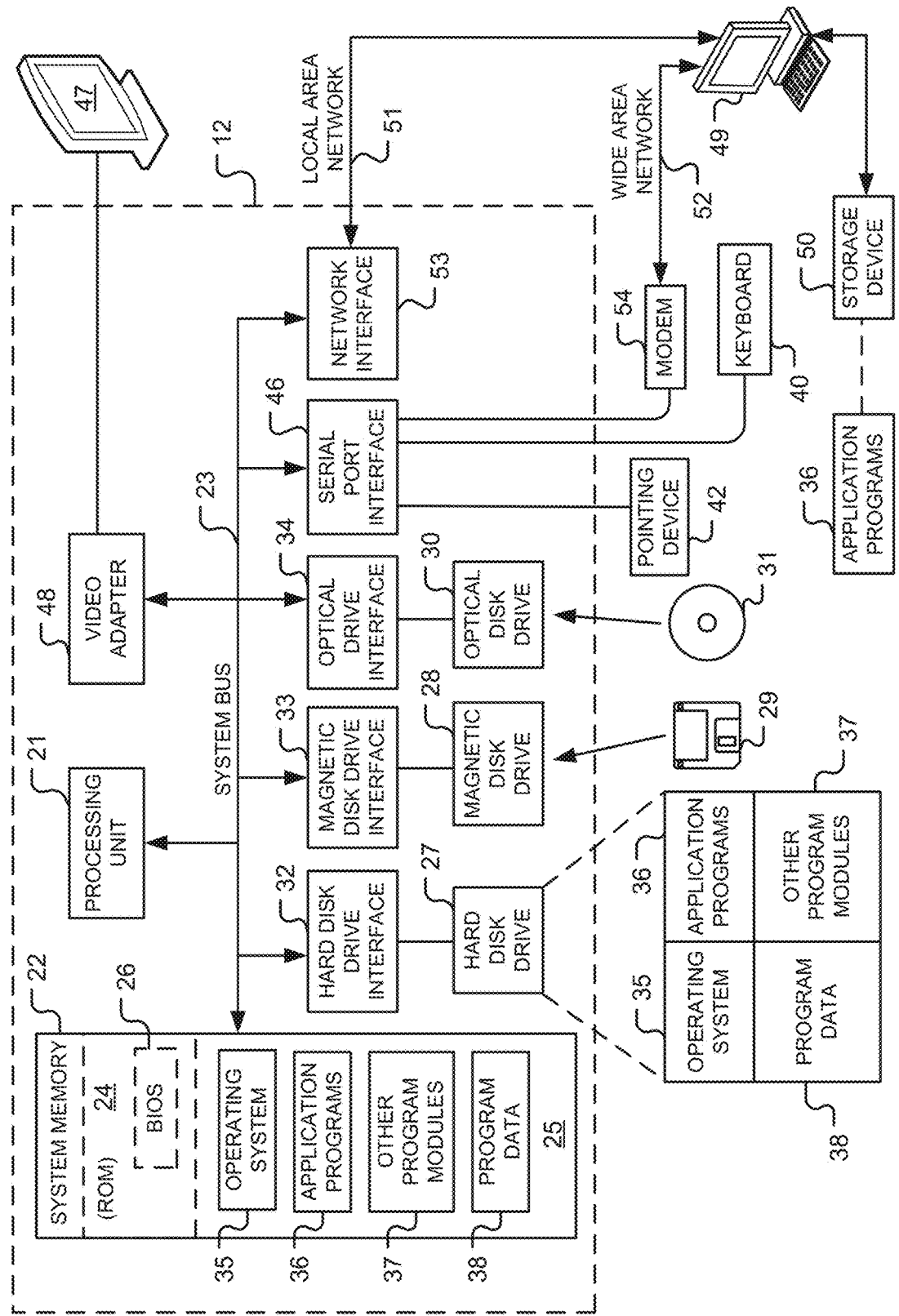
FIG. 4 is a diagram of a hardware environment and an operating environment that may be used to perform the method of FIG. 1.

FIG. 1 is flow diagram of a method 100 that may be performed at runtime by an application 112 (see FIG. 2) executing on one or more computing devices, e.g., each like the computing device 12 (see FIG. 4). The method 100 creates a compiled static "dynamic" class definition 102 (see FIG. 2) and instantiates the compiled class definition 102 to create a "partially strongly typed" new object 104 (see FIG. 2) at runtime. Referring to FIG. 2, the new object 104 created at runtime may be serialized and strongly typed operations may be performed upon the new object 104. The method 100 may be performed using the .NET Framework, which is a software framework developed by Microsoft. The method 100 (see FIG. 1) uses two different concepts to create the new object 104: reflection and a static "dynamic" class.

In first block 110 (see FIG. 1), at runtime, an executing application 112 obtains a class name 114 and a property list 116 from a first data store 118. By way of non-limiting examples, the first data store 118 may be implemented as a string, a stream, a file (e.g., a text file), a database, and the like. The property list 116 includes information defining at least one property. The information includes, for each property, a property name and an associated property type (e.g., integer, Boolean, etc.). Each property type is a strong type.

In next block 120 (see FIG. 1), the executing application 112 writes (e.g., as text) an uncompiled class definition 122 implementing a known or compiled interface 124 (e.g., stored in an assembly 126). The assembly 126 may be implemented as a dynamic link library ("DLL") file or an executable ("EXE") file. The class definition 122 may be written to a second data store 128. By way of non-limiting examples, the second data store 128 may be implemented as a file (e.g., a text file), and the like. The interface 124 includes signatures 129 of one or more methods, properties, events, and/or indexers. In FIG. 2, the interface 124 is illustrated as being Data, which includes the signatures 129 of a property (an integer type property named "ID") and a function named "function1" that returns an integer and does not receive any parameters.

In block 130 (see FIG. 1), the executing application 112 adds one or more attributes to the class definition 122 that are necessary to specify a desired serialization method. For example, referring to FIG. 3, a "SerializableAttribute" attribute 132 may be included immediately before (e.g., in a header of) the class definition 122. By way of another non-limiting example, a "NonSerializedAttribute" attribute (not shown) may be included before one or more properties to indicate those properties are not to be serialized. By way of yet another example, an "ISerializable" interface (not shown) may be included in the class definition 122 that allows the class to control its serialization process.

Referring to FIG. 2, in block 140 (see FIG. 1), the executing application 112 writes the member(s) included in the signatures 129 of the interface 124 into the class definition 122. As mentioned above, the interface 124 includes only the signatures 129 of the get and set functions for each property. The executing application 112 writes the bodies of the get and set functions for each property (e.g., the integer type property "ID") into the class definition 122. Additionally, the executing application 112 also writes the body of each function (e.g., the function named "function1") included in the signatures 129. The executing application 112 may use reflection to identify the member(s). Thus, referring to FIG. 3, the class definition 122 includes first and second portions 142 and 144. The first portion 142 includes the one or more properties of the interface 124 and their associated get and set functions. The second portion 144 includes any other members of the interface 124.

Referring to FIG. 2, in block 150 (see FIG. 1), the executing application 112 writes each property name and associated property type in the property list 116 into the class definition 122. The executing application 112 also writes get and set functions for each property into the class definition 122. For example, the property list 116 may include a property name "PropertyList1" associated with the property type "int." Thus, referring to FIG. 3, the class definition 122 includes a third portion 152 that includes the one or more properties (e.g., the property name "PropertyList1") defined in the property list 116 and get and set functions associated with each property.

Referring to FIG. 2, in block 160 (see FIG. 1), the executing application 112 creates a new assembly 162 by compiling the class definition 122. Thus, the new assembly 162 includes the compiled class definition 102, which is a compiled version of the class definition 122. By way of a non-limiting example, in block 160 (see FIG. 1), the executing application 112 may create instances of a compiler parameter object 166 (e.g., a CompilerParameters object) and a compiler object 168 (e.g., a CSharpCodeProvider object).

The compiler parameter object 166 has properties that store values that are used to configure the compiler object 168. In block 160 (see FIG. 1), the compiler parameter object 166 may be configured to output a library file having a particular file name. The compiler parameter object 166 has a generate executable property (e.g., named "GenerateExecutable") that specifies the compiler's output. The generate executable property may be of type Boolean. When the generate executable property is set equal to TRUE, the compiler generates an executable file. On the other hand, when the generate executable property is set equal to FALSE, the compiler generates the new assembly 162 (e.g., a DLL file). The compiler parameter object 166 may have a file name property (e.g., named "OutputAssembly") that is set equal to a desired filed name. For example, the generate executable property of the compiler parameter object 166 may be set to FALSE and the file name property of the compiler parameter object 166 may be set a file name (e.g., "[model name].DLL").

The compiler parameter object 166 has a referenced assemblies property (e.g., named "ReferencedAssemblies") that may be used to include other assemblies referenced by the class definition 122. For example, any assemblies needed to achieve desired serialization may be added using the referenced assemblies property.

The compiler object 168 may have a compile method configured to compile the class definition 122. The compile method may have two input parameters, text to be compiled (e.g., the class definition 122) and the compiler parameter object 166. In block 160 (see FIG. 1), the executing application 112 compiles the class definition 122 by calling the compile method of the compiler object 168 (e.g., a CSharpCodeProvider object) and passing both the class definition 122 and the compiler parameter object 166 to the compile method as parameters.

In block 170 (see FIG. 1), the executing application 112 loads the new assembly 162 created in block 160 (see FIG. 1). In other words, the compiled code is made available to the executing application 112 in block 170 (see FIG. 1).

In block 180 (see FIG. 1), the executing application 112 creates the new object 104 by instantiating the compiled class definition 102 in the loaded assembly 162. By way of a non-limiting example, in block 170 (see FIG. 1), the executing application 112 may use an activator object (e.g., named "Activator") and its create instance method (e.g., Activator.CreateInstance) to create the new object 104. The create instance method may receive a parameter identifying the class definition (e.g., the compiled class definition 102) to be instanced.

In block 190 (see FIG. 1), the executing application 112 performs one or more operations on the new object 104 at runtime. The operation(s) change the state of the new object 104. The operation(s) may include a strongly typed operation, which does not trigger a runtime error because the one or more properties of the interface 124 written in the first portion 142 (see FIG. 3) and the one or more properties (defined in the property list 116 illustrated in FIG. 2) written in the third portion 152 (see FIG. 3) are each strongly typed. The strongly typed operation may be configured to be performed on an object that implements the interface 124. Because the new object 104 implements the interface 124, a runtime error will not be triggered when the strongly typed operation is performed on the new object 104.

In optional block 192 (see FIG. 1), the executing application 112 serializes the new object 104 at runtime. As mentioned above, serialization is the process of converting the state of the new object 104 into a stream of data 196 that can be transmitted over a network, shared with another computer program, and/or stored in a persistent storage location (e.g., a physical file, a database, a cache (such as an ASP.NET Cache), and the like). Optionally, the serialized state of the object may be sent or transmitted as the data stream 196 by the executing application 112 to a different application domain 200 (e.g., a different executing application). The application domain 200 may be configured to convert the data stream 196 into an object 210. The object 210 may be identical to the new object 104 at the time the new object 104 was serialized. While the application domain 200 is illustrated as being implemented by the same computing device as the executing application 112, this is not a requirement and the application domain 200 may execute on a different computing device (e.g., a remote computing device connected by a network to the computing device executing the executing application 112). Then, the method 100 terminates.

The new object 104 was created by the executing application 112 from the compiled class definition 102, can be reflected on normally, and is serializable as desired. The method 100 (see FIG. 1) gives a user the ability to cast a complete class definition (e.g., the compiled class definition 102) at runtime that includes both a limited set known attributes (obtained from the interface 124) and any number of attributes of strong type (obtained from the property list 116). Further, instances of the compiled class definition 102 can be serialized (e.g., within the .NET Framework).

The method 100 allows users to create unique data (e.g., a business model) and a computer program to perform strongly typed operations on the data without the need to write any additional or new computer code. Further, the data as read into the new object 104 (and possibly transformed by the computer program) is serializable, which allows it to be used in web-based implementations, client-server transport platforms, messaging, and the like.

Computing Device

FIG. 4 is a block diagram of hardware and an operating environment in conjunction the method 100 may be performed. The description of FIG. 4 is intended to provide a brief, general description of suitable computer hardware and a suitable computing environment for performing the method 100. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 4 includes a general-purpose computing device in the form of the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, a blade computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 4 include a local-area network (LAN) 51 and a wide-area network (WAN) 52. Such networking environments are commonplace in offices, enterprise-wide computer networks, intranets, and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of the method 100 illustrated in FIG. 1 and described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method, comprising:
   writing a class definition that includes a known interface, wherein the known interface includes a limited set of known properties according to a list of properties in a first data store, one or more of the properties of a strong type;
   adding one or more attributes to the class definition, wherein the attributes include a serialization attribute corresponding to a serialization method and a non-serialization attribute indicating one or more properties that are not to be serialized;
   writing a reflected interface member to the class definition, the reflected interface member corresponding to a function for a property in the class definition;
   writing a property to the class definition according to the list of properties;
   generating a new assembly, wherein the new assembly is generated by compiling the class definition, and wherein the compiled class definition includes the limited set of known properties and one or more values corresponding to the properties;
   generating an object from the compiled class definition of the new assembly from a second data store; and
   converting the object into a stream of data according to the serialization method, wherein the object data stream includes the serialization attribute that facilitates converting the object data stream into a new object, wherein the object and the new object are identical, and wherein a strongly typed operation can be performed on the object data stream without writing additional code.

2. The method of claim 1, wherein the strongly typed operation can be performed on the object data stream without triggering a runtime error.

3. The method of claim 1, wherein writing the class definition includes using a class name to name the class definition.

4. The method of claim 1, wherein the property is associated with a property name and a property type.

5. The method of claim 1, wherein the class definition is written to a text file.

6. The method of claim 1, wherein the function written to the class definition includes a get function and a set function.

7. A system, comprising:
   one or more data processors; and
   a non-transitory computer-readable storage medium containing instructions which when executed on the one or more data processors, cause the one or more processors to perform operations including:
      writing a class definition that includes a known interface, wherein the known interface includes a limited set of known properties according to a list of properties in a first data store, one or more of the properties of a strong type;
      adding one or more attributes to the class definition, wherein the attributes include a serialization attribute corresponding to a serialization method and a non-serialization attribute indicating one or more properties that are not to be serialized;
      writing a reflected interface member to the class definition, the reflected interface member corresponding to a function for a property in the class definition;
      writing a property to the class definition according to the list of properties;
      generating a new assembly, wherein the new assembly is generated by compiling the class definition, and wherein the compiled class definition includes the limited set of known properties and one or more values corresponding to the properties;
      generating an object from the compiled class definition of the new assembly from a second data store; and
      converting the object into a stream of data according to the serialization method, wherein the object data stream includes the serialization attribute that facilitates converting the object data stream into a new object, wherein the object and the new object are identical, and wherein a strongly typed operation can be performed on the object data stream without writing additional code.

8. The system of claim 7, wherein the strongly typed operation can be performed on the object data stream without triggering a runtime error.

9. The system of claim 7, wherein writing the class definition includes using a class name to name the class definition.

10. The system of claim 7, wherein the property is associated with a property name and a property type.

11. The system of claim 7, wherein the class definition is written to a text file.

12. The system of claim 7, wherein function written to the class definition includes a get function and a set function.

13. A computer-program product tangibly embodied in a non-transitory machine-readable storage medium, including instructions configured to cause a data processing apparatus to:
   write a class definition that includes a known interface, wherein the known interface includes a limited set of known properties according to a list of properties in a first data store, one or more of the properties of a strong type;
   add one or more attributes to the class definition, wherein the attributes include a serialization attribute corresponding to a serialization method and a non-serialization attribute indicating one or more properties that are not to be serialized;
   write a reflected interface member to the class definition, the reflected interface member corresponding to a function for a property in the class definition;
   write a property to the class definition according to the list of properties;
   generate a new assembly, wherein the new assembly is generated by compiling the class definition, and wherein the compiled class definition includes the limited set of known properties and one or more values corresponding to the properties;
   generate an object from the compiled class definition of the new assembly; and
   convert the object into a stream of data according to the serialization method, wherein the object data stream includes the serialization attribute that facilitates converting the object data stream into a new object, wherein the object and the new object are identical, and wherein a strongly typed operation can be performed on the object data stream without writing additional code.

14. The computer-program product of claim 13, wherein the strongly typed operation can be performed on the object data stream without triggering a runtime error.

15. The computer-program product of claim 13, wherein writing the class definition includes using a class name to name the class definition.

16. The computer-program product of claim 13, wherein the property is associated with a property name and a property type.

17. The computer-program product of claim 13, wherein the class definition is written to a text file.

18. The computer-program product of claim 13, wherein the function written to the class definition includes a get function and a set function.

\* \* \* \* \*